United States Patent
Suchowski et al.

(10) Patent No.: US 11,181,804 B2
(45) Date of Patent: Nov. 23, 2021

(54) METHOD AND SYSTEM FOR FREQUENCY CONVERSION

(71) Applicant: Ramot at Tel-Aviv University Ltd., Tel-Aviv (IL)

(72) Inventors: Haim Suchowski, Kfar Mordechai (IL); Asaf Dahan, Tel-Aviv (IL); Assaf Levanon, Tel-Aviv (IL)

(73) Assignee: Ramot at Tel-Aviv University Ltd., Tel-Aviv (IL)

( * ) Notice: Subject to any disclaimer, the term of this patent is extended or adjusted under 35 U.S.C. 154(b) by 0 days.

(21) Appl. No.: 16/631,464

(22) PCT Filed: Jul. 17, 2018

(86) PCT No.: PCT/IB2018/055298
§ 371 (c)(1),
(2) Date: Jan. 16, 2020

(87) PCT Pub. No.: WO2019/016701
PCT Pub. Date: Jan. 24, 2019

(65) Prior Publication Data
US 2020/0209709 A1    Jul. 2, 2020

Related U.S. Application Data

(60) Provisional application No. 62/533,233, filed on Jul. 17, 2017.

(51) Int. Cl.
*G02F 1/355*    (2006.01)
*G02F 1/37*    (2006.01)
(Continued)

(52) U.S. Cl.
CPC ............ *G02F 1/3775* (2013.01); *G02F 1/355* (2013.01); *G02F 1/3551* (2013.01);
(Continued)

(58) Field of Classification Search
CPC ...... G02F 1/355; G02F 1/3551; G02F 1/3558; G02F 1/37; G02F 1/3775; H01S 3/0092
See application file for complete search history.

(56) References Cited

U.S. PATENT DOCUMENTS 5,815,307 A    9/1998   Arbore et al.
5,867,304 A *  2/1999   Galvanauskas ....... H01S 3/2308
                                                    359/25

(Continued)

FOREIGN PATENT DOCUMENTS

EP          2265992        12/2010
WO     WO 2019/016701      1/2019

OTHER PUBLICATIONS

International Preliminary Report on Patentability dated Jan. 30, 2020 From the International Bureau of WIPO Re. Application No. PCT/IB2018/055298. (7 Pages).

(Continued)

*Primary Examiner* — Daniel Petkovsek (57) ABSTRACT

A system for frequency conversion, comprises a laser source and a harmonic generation crystal. The laser source is configured to produce optical pulse energy of less than 100 µJ. The harmonic generation crystal comprises a structure characterized by a nonlinear susceptibility, and a crystal grating period which adiabatically varies along the longitudinal direction in a manner that the crystal grating period is inversely proportional to a crystal grating function of a coordinate z measured along the longitudinal direction.

19 Claims, 6 Drawing Sheets
(4 of 6 Drawing Sheet(s) Filed in Color)

(51) Int. Cl.
  *G02F 1/377*  (2006.01)
  *G02F 1/35*  (2006.01)
  *H01S 3/00*  (2006.01)

(52) U.S. Cl.
  CPC ............. *G02F 1/3558* (2013.01); *G02F 1/37* (2013.01); *G02F 1/353* (2013.01); *H01S 3/0092* (2013.01)

(56) References Cited

U.S. PATENT DOCUMENTS

| | | | | |
|---|---|---|---|---|
| 6,198,568 | B1* | 3/2001 | Galvanauskas | H01S 3/0057 359/332 |
| 8,331,017 | B2* | 12/2012 | Suchowski | G02F 1/3558 359/326 |
| 2012/0062983 | A1 | 3/2012 | Imeshev et al. | |
| 2016/0064891 | A1 | 3/2016 | Imeshev et al. | |
| 2019/0089120 | A1* | 3/2019 | Abeeluck | H01S 3/1631 |

OTHER PUBLICATIONS

International Search Report and the Written Opinion dated Nov. 29, 2018 From the International Searching Authority Re. Application No. PCT/IB2018/055298. (11 Pages).

Agate et al. "Portable Ultrafast Blue Light Sources Designed With Frequency Doubling in KTP and KNbO3", IEEE Journal of Selected Topics in Quantum Electronics, 10(6): 1268-1276, Nov./Dec. 2004.

Dahan et al. "Ultrafast Adiabatic Second Harmonic Generation", Journal of Physics: Condensed Matter, 29(8): 084004-1-084004-9, Published Online Jan. 16, 2017.

Gallmann et al. "Generation of Sub-6-Fs Blue Pulses by Frequency Doubling With Quasi-Phase-Matching Gratings", Optics Letters, 26(9): 614-616, May 1, 2001.

Supplementary European Search Report and the European Search Opinion dated Mar. 16, 2021 From the European Patent Office Re. Application No. 18834874.2. (10 Pages).

\* cited by examiner

METHOD AND SYSTEM FOR FREQUENCY CONVERSION

RELATED APPLICATIONS

This application is a National Phase of PCT Patent Application No. PCT/IB2018/055298 having International filing date of Jul. 17, 2018, which claims the benefit of priority under 35 USC § 119(e) of U.S. Provisional Patent Application No. 62/533,233 filed on Jul. 17, 2017. The contents of the above applications are all incorporated by reference as if fully set forth herein in their entirety.

The project leading to this application has received funding from the European Research Council (ERC) under the European Union's Horizon 2020 research and innovation programme (grant agreement No 639402).

FIELD AND BACKGROUND OF THE INVENTION

The present invention, in some embodiments thereof, relates to a frequency conversion and, more particularly, but not exclusively, to adiabatic frequency conversion.

Ultrashort pulse lasers oscillators and amplifiers are used in scientific exploration and industrial applications, to explore phenomena that occur at the ultrafast time scale of many scientific processes and dynamical evaluations in nature [1-3]. Due to their extremely high peak power, nonlinear optics in the ultrashort regime results in an enhanced efficient frequency conversion generation processes, and is therefore of great interest in vast number of fields, such as color generation, nonlinear spectroscopy, imaging for metallurgy, photo-induced dynamics, noninvasive background free diagnostics and the generation of new color sources [4-6].

As these ultrashort pulses are much faster than any electronic system, many methods have been developed order to characterize those pulses, including ultrafast pump-probe and interferometric capabilities, allowing femtosecond temporal resolution experiments and ultrafast characterization methods, such as frequency resolved optical gating (FROG), multiphoton intrapulse interference phase scan (MIIPS) and spectral phase interferometry for direct electric-field reconstruction (SPIDER) [1, 7-9]. Among the various nonlinear conversion processes, three wave mixing and especially second harmonic generation (SHG) became widely used.

Conventional conversion devices provide conversion for narrow band of frequencies since there is a tradeoff between the conversion bandwidth and the conversion efficiency, rooted in the phase mismatch between the interacting waves.

Adiabatic frequency conversions [11-18] employs a crystal with a periodic pole structure, braying adiabatically from a negative mismatch to an incoming light frequency for conversion at one end of the crystal and to a positive mismatch to the frequency at the other end of the crystal. The technique has shown to overcome the tradeoff between conversion efficiency and bandwidth for sum frequency generation (SFG), difference frequency generation (DFG) and optical parametric amplification (OPA). In nonlinear processes, conventional adiabatic frequency conversion techniques use high pump energies for satisfying the adiabatic criteria.

SUMMARY OF THE INVENTION

According to an aspect of some embodiments of the present invention there is provided a system for frequency conversion. The system comprises a laser source and a harmonic generation crystal, wherein the laser source is configured to produce optical pulse energy of less than 100 µJ, and wherein the harmonic generation crystal comprises a structure characterized by a nonlinear susceptibility, and a crystal grating period which adiabatically varies along the longitudinal direction in a manner that the crystal grating period is inversely proportional to a crystal grating function of a coordinate z measured along the longitudinal direction.

According to some embodiments of the invention the laser source is configured to produce optical pulse energy of less than 10 µJ. According to some embodiments of the invention the laser source is configured to produce optical pulse energy of less than 1 µJ. According to some embodiments of the invention the laser source is configured to produce optical pulse energy of less than 0.1 µJ.

According to an aspect of some embodiments of the present invention there is provided a method of frequency conversion. The frequency conversion method comprises directing a plurality of input optical pulses, each having the same wavelength and energy of less than 100 µJ, to a harmonic generation crystal thereby effecting frequency multiplication of the optical pulses, wherein the harmonic generation crystal comprises a structure characterized by a nonlinear susceptibility, and a crystal grating period which adiabatically varies along the longitudinal direction in a manner that the crystal grating period is inversely proportional to a crystal grating function of a coordinate z measured along the longitudinal direction.

According to some embodiments of the invention the adiabatic variation is continuous along the longitudinal direction.

According to some embodiments of the invention the adiabatic variation is discrete along the longitudinal direction.

According to some embodiments of the invention the variation is from a positive mismatch to a frequency of the optical pulse to a negative mismatch to the frequency.

According to some embodiments of the invention each period of the adiabatic variation has a length within an order of magnitude of a wavelength of the optical pulse.

According to some embodiments of the invention the adiabatically varying crystal grating period is characterized by a nonlinear susceptibility which alternate in sign along the longitudinal direction.

According to some embodiments of the invention the crystal is a poled crystal.

According to some embodiments of the invention the crystal is an angle phase matched crystal.

According to some embodiments of the invention the crystal is a birefringence phase-matched crystal.

According to some embodiments of the invention the crystal is under a temperature gradient.

According to some embodiments of the invention the crystal grating function is within less than 20% from a predetermined polynomial function of z, for any value of z within a length of the crystal, wherein the predetermined polynomial function is one of the functions listed in Tables 1-6.

According to an aspect of some embodiments of the present invention there is provided a method of spectroscopy. The spectroscopy method comprises executing the frequency conversion method as delineated above and optionally and preferably as further exemplified below to provide a harmonic of the optical pulse, probing a sample by the harmonic, and analyzing a signal received from the sample following the probing.

According to an aspect of some embodiments of the present invention there is provided a method of manipulating a light beam. The light beam manipulating method comprises shaping a light pulse and executing the frequency conversion method as delineated above and optionally and preferably as further exemplified below, using the shaped pulse as the input optical pulse.

According to an aspect of some embodiments of the present invention there is provided a method of imaging. The imaging method comprises executing the frequency conversion method as delineated above and optionally and preferably as further exemplified below to provide a harmonic of the optical pulse, directing the harmonic to a target, and generating an image of the target based on a signal received from the target following the directing.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF SEVERAL VIEWS OF THE DRAWINGS

The patent or application file contains at least one drawing executed in color. Copies of this patent or patent application publication with color drawings will be provided by the Office upon request and payment of the necessary fee.

Some embodiments of the invention are herein described, by way of example only, with reference to the accompanying drawings. It is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

The present invention, in some embodiments thereof, relates to a frequency conversion and, more particularly, but not exclusively, to adiabatic frequency conversion.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Figure 5:
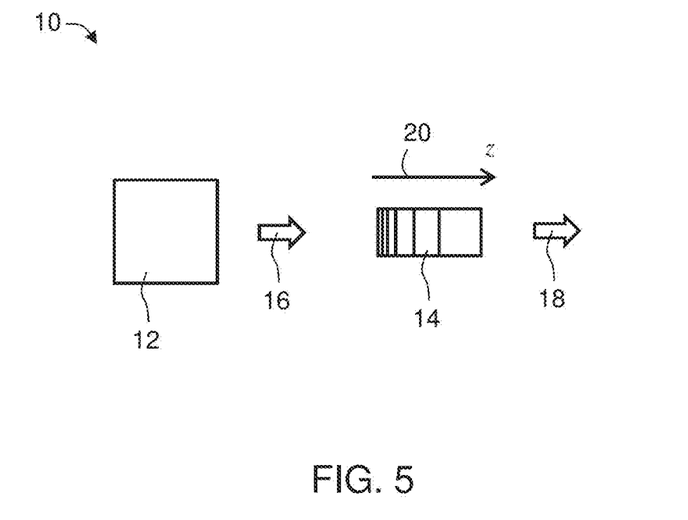
FIG. 5 is a schematic illustration of a system for frequency conversion, according to some embodiments of the present invention.

FIG. 5 is a schematic illustration of a system 10 for frequency conversion, according to some embodiments of the present invention. System 10 comprises a laser source 12 and a harmonic generation crystal 14. Laser source 12 is preferably configured to produce optical pulses 16, referred to below as "pump pulses", that interact with crystal 14. The energy of each of pulses 16 is optionally and preferably less than 100 μJ, more preferably less than 10 μJ, or less than 1 μJ, or less than 0.1 μJ.

In some embodiments of the present invention pulses 16 have a bandwidth in the UV range, in some embodiments of the present invention pulses 16 have a bandwidth in the visible range, in some embodiments of the present invention pulses 16 have a bandwidth in the IR range, in some embodiments of the present invention pulses 16 have a bandwidth in the NIR range, in some embodiments of the present invention pulses 16 have a bandwidth in the MIR rang, in some embodiments of the present invention pulses 16 have a bandwidth in the FIR range, and in some embodiments of the present invention pulses 16 have a bandwidth spanning over, or bridging between, two or more of these ranges.

An "ultraviolet (UV) range," as used herein, refers to a range of wavelengths from about 100 nm to about 400 nm.

A "visible range," as used herein, refers to a range of wavelengths from about 400 nm to about 700 nm.

An "infrared (IR) range," as used herein, refers to a range of wavelengths from about 700 nm to about 1 mm.

A "near infrared (NIR) range," as used herein, refers to a range of wavelengths from about 700 nm to about 2500 nm.

A "mid infrared (MIR) range," as used herein, refers to a range of wavelengths from about 2000 nm to about 25 µm.

A "far infrared (FIR) range," as used herein, refers to a range of wavelengths from about 20 µm to about 100 µm.

In some embodiments of the present invention pulses 16 have a bandwidth of at least 20 nm or at least 40 nm or at least 60 nm or at least 80 nm or at least 100 nm or at least 120 nm or at least 140 nm or at least 160 nm or at least 180 nm or at least 200 nm or at least 300 nm or at least 350 nm or at least 400 nm or at least 450 nm or at least 500 nm or more.

The harmonic generation crystal 14 is suitable for any nonlinear process, optionally and preferably in a regime that is not linearized regime. The harmonic generation crystal 14 converts the frequency of at least a portion of the energy carried by the pump pulses 16 and provides light 18 having a different frequency than the frequency of pulses 16. Typically, the frequency of light 18 is a harmonic, preferably a second harmonic, of the frequency of pulses 16. Light 18 is typically a pulsed light, so that each of pulse 16 is converted separately.

The harmonic generation crystal 14 optionally and preferably comprises a structure characterized by a nonlinear susceptibility, and a crystal grating period which adiabatically varies along the longitudinal direction 20 of crystal 14 in a manner that the crystal grating period is inversely proportional to a crystal grating function of a coordinate z measured along the longitudinal direction 20. Herein, the crystal grating function is denoted $K_g(z)$ and the crystal grating period is denoted $\Lambda(z)$, so that in various exemplary embodiments of the invention $\Lambda(z)$ is inversely proportional to $K_g(z)$, e.g., $\Lambda(z)=2\pi/K_g(z)$.

The crystal grating function of crystal 14 can be determined by measuring the crystal grating period $\Lambda(z)$ and fitting $\Lambda(z)$ to a function, which is then determined to be the reciprocal of the crystal grating function (or, equivalently, fitting the reciprocal of $\Lambda(z)$ to a function, which is then determined to be the crystal grating function itself).

In some embodiments of the present invention the adiabatic variation of $\Lambda$ is continuous along the longitudinal direction, and in some embodiments of the present invention the adiabatic variation is discrete (e.g., the variation is realized in discrete steps) along longitudinal direction.

The crystal grating function is optionally and preferably selected to provide harmonic generation (e.g., SHG), more preferably broadband harmonic generation (e.g., broadband SHG). In an embodiment, the grating function is selected to provide a sufficiently flat broadband conversion, for example, having a variation of at most ±20% or at most ±15% or at most ±10% or at most ±5% of the conversion efficiency over the entire bandwidth. As a representative example, the grating function can be approximated as a polynomial function of z. For example, the crystal grating function can be within less than p % from the polynomial function, wherein p equals 20 or 15 or 10 or 5, over the entire range of z occupied by crystal 14, e.g., when the crystal's length is L and the z axis is defined such that crystal 14 spans from $z=-L/2$ to $z=+L/2$, the crystal grating function can be within less than p % from the polynomial function for any $z \in [-L/2, L/2]$.

Optionally, but not necessarily, the polynomial function comprises a second, third, fourth, fifth or higher order polynomial function. For example, a third order polynomial function can be written as $a_0+a_1z+a_2z^2+a_3z^3$, a fourth order polynomial function can be written as $a_0+a_1z+a_2z^2+a_3z^3+a_4z^4$, a fifth order polynomial function can be written as $a_0+a_1z+a_2z^2+a_3z^3+a_4z^4\pm a_5z^5$, etc., wherein $a_0 \ldots a_5$ are coefficients of the polynomial function. Many examples for polynomial functions suitable for some embodiments of the present invention are provided in the Examples section that follows.

In some embodiments of the present invention the crystal 14 has a structure that is characterized by a nonlinear susceptibility which alternate in sign along the longitudinal direction. In some embodiments of the present invention the nonlinear susceptibility is a second-order susceptibility.

The pulses 16 and the converted light 18 interact within the crystal 14, and there is typically a phase-mismatch between different spectral components of the pulses 16 and light 18. In some embodiments of the present invention the variation of the crystal grating period is from a positive mismatch to a frequency of pulse 16 at one end of the crystal to a negative mismatch to the frequency of pulse 16 at the opposite end of the crystal. Typically, each period of the adiabatic variation has a length within an order of magnitude of the wavelength of pulse 16.

The phase-mismatch can be wavelength dependent, and can optionally also be z-axis dependent. In some embodiments of the present invention crystal 14 has a phase-mismatch compensation structure for at least partially compensating the phase-mismatch between different spectral components of the pulses 16 and 18. In some embodiments of the present invention the crystal is an angle phase matched crystal, and in some embodiments of the present invention the crystal is a birefringence phase-matched crystal. Also contemplated are embodiments in which crystal 14 is under a temperature gradient, selected so as to at least partially compensate the phase mismatch between different spectral components of the pulses 16 and 18. Such a temperature gradient can be applied, for example, by cooling or heating one side of crystal 14, e.g., using a heat source or a heat sink (not shown), or by placing crystal 14 in a chamber (not shown) having a temperature gradient therein).

When light 16 is a SHG light, the phase mismatch $\Delta k(\omega)$ can be defined as: $\Delta k(\omega)=k_{SHG}(2\omega)-2k_1(\omega)$, $\omega$ is the angular frequency of a spectral component of pulses 16, $k_{SHG}(\omega)$ is a wave vector of the second harmonic field $$k_{SHG}(\omega) = \frac{2\omega \cdot n(2\omega)}{c}, \quad k_1(\omega) = \frac{\omega \cdot n(\omega)}{c},$$

c is the speed of light, and $n(\omega)$ and $n(2\omega)$ are the refraction index of the bulk crystal 14 in $\omega$ and $2\omega$, respectively.

The grating function is optionally and preferably selected to compensate the inherent phase mismatch between the different spectral components of the pulses 16 and 18. In some embodiments of the invention the crystal grating function $K_g(z)$ is selected to range between all values of $\Delta k(\omega)$, where $K_g(z)$ spans all over the pump spectra. The adiabatic design procedure of the grating function according to some embodiments of the present invention can start with an initial approximation. For example, the approximation can include a grating period $$\Lambda(z) = \frac{2\pi}{K_g(z)}$$

that is increased linearly with the optical axis:

$$\Lambda_{min} = \min\left(\frac{2\pi}{\Delta k(\omega)}\right), \Lambda_{max} = \max\left(\frac{2\pi}{\Delta k(\omega)}\right)$$

$$\Lambda(z) = \Lambda_{min} + (\Lambda_{max} - \Lambda_{min})\frac{(z - z_{in})}{L_c}$$

where $L_c$ is the crystal length and $z_{in}$ is the coordinate of the crystal input facet.

The obtained grating function $$K_g(z) = \frac{2\pi}{\Lambda(z)}$$

is then optionally and preferably expanded, for example, in a polynomial manner in terms of normalized optical coordinate $z_{norm} = (z - z_{in})/L_c$:

$$K_g^{initial}(z) = \sum_{k=0}^{n} a_k \left(\frac{z - z_{in}}{L_c}\right)^k$$

where n is the expansion order, and $a_k$ are the expansion coefficients.

The obtained performance of the achieved design can then be examined using a numerical simulation as further detailed in the Examples section that follows, and the conversion efficiency of the adiabatic process can be calculated using the pump pulse spectra.

In various exemplary embodiments of the invention the initial grating function design is improved in an iterative manner. For example, several parameters can be introduced into the initial expression. The parameters can be selected to modify the simulated wavelength dependent conversion efficiency. Representative examples of such parameters include, without limitation, a coefficient α of the z coordinate, a coefficient γ of the exponent k, and an offset parameter β. Other parameters are also contemplated. In some embodiments of the present invention one, two or three parameters of the set {α, β, γ} are employed, as shown in the following equation:

$$K_g^{iterative}(z) = \sum_{k=0}^{n} a_k \left(\frac{\alpha z - z_{in}}{L_c}\right)^{\gamma k} + \beta$$

Numerical simulation can be applied to select the values of the parameter so as to improve the SHG design for specific crystal length and pump spectra.

The phase mismatch between the interacting waves can be compensated, as stated, in more than one way, without limitation, the poling method [10], the birefringence method, the angle-phase matching method and the temperature gradient method. When, for example, poling is employed, the nonlinear susceptibility χ(z) (e.g., second order susceptibility) fluctuates between +χ and −χ in batches determined by χ(z)=χsign(cos(K_g(z)z)).

System 10 can be utilized for many applications. In some embodiments of the present invention system 10 is used for imaging, in some embodiments of the present invention system 10 is used for spectroscopy, and in some embodiments of the present invention system 10 is used for beam shaping.

Figure 6A:
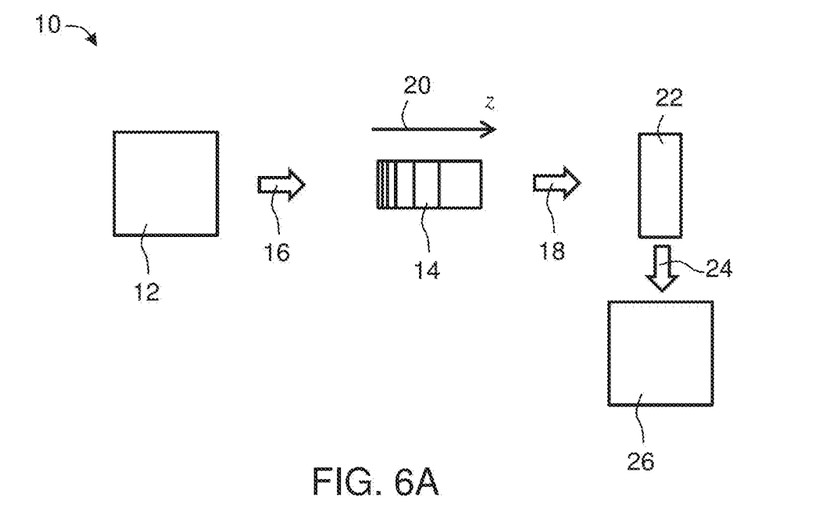
FIGS. 6A and 6B are schematic illustrations showing optional implementations of the system of FIG. 5.

FIG. 6A illustrates an embodiment in which system 10 is used for spectroscopy or imaging. In this embodiment, the light 18 is directed to a sample 22 to probe the sample. An optical signal 24 is received from sample 22 following the probing. The signal 24 can be reflected off sample 22, scattered off sample 22, or transmitted through sample 22. Signal 24 is then directed to an optoelectronic system 26. For spectroscopy, optoelectronic system 26, can be include a signal analyzer performing spectroscopy analysis of signal 24. For imaging, optoelectronic system 26 can be an imager providing an image of sample 22 as known in the art.

Figure 6B:
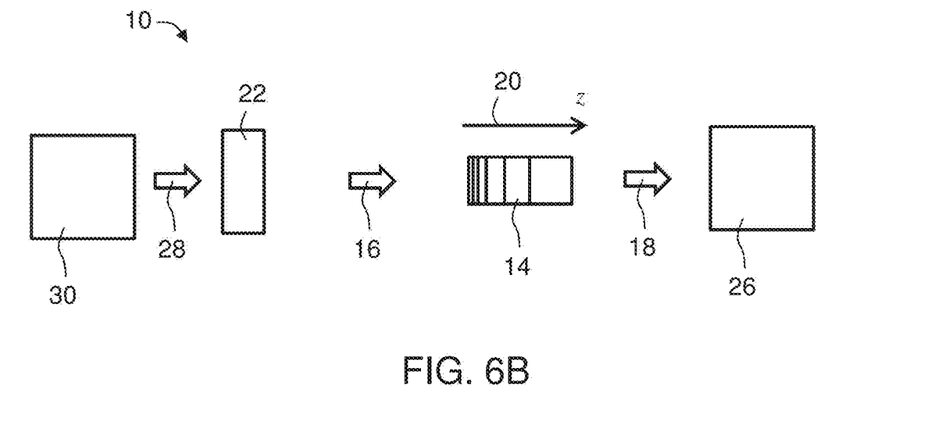

FIG. 6B illustrates another embodiment in which system 10 is used for spectroscopy or imaging. In this embodiment, a pulsed light beam 28 generated by a light beam source 30 is directed to sample 22 to probe the sample. Light pulses 16, reflected, scattered or transmitted through sample 22 are directed to crystal 14 and are converted by crystal 14 to provide light 18. Light 18 is then directed to optoelectronic system 26. For spectroscopy, optoelectronic system 26, can be include a signal analyzer performing spectroscopy analysis of signal 24. For imaging, optoelectronic system 26 can be an imager providing an image of sample 22 as known in the art.

System 10 can also be used for manipulating a light beam. In these embodiments, a light pulse is shaped, and the frequency conversion is executed as described herein using the shaped pulse as the input optical pulse 16. A representative example of such light beam manipulation is provided in the Examples section that follows.

The word "exemplary" is used herein to mean "serving as an example, instance or illustration." Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments." Any particular embodiment of the invention may include a plurality of "optional" features unless such features conflict.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non-limiting fashion.

Example 1

Experiments and Simulations

The present inventors demonstrated experimentally that adiabatic design is capable of providing efficient SHG also in powers of conventional femtosecond oscillators.

In this example flat conversion of more than 35 nm wavelength is demonstrated by designing an adiabatic aperiodically poled potassium titanyl phosphate (KTP) crystal. The present inventors showed that with pulse peak energies of nJ-regime, one can achieve above 50% photon number efficiencies for 70 fs Ti-Sappire pulses.

The flat conversion bandwidth response of the presented design, allows performing broadband pulse shaping manipulations prior to the nonlinear optical conversion, thus not suffering from the spectral limitation that conventionally imposed by the limited bandwidth of birefringence or regular periodic crystals designs. For example, using spatial light modulator (SLM) in a 4-f pulse shapers, the present inventors provided a tunable pump probe apparatus based on a varying absolute phase spectral shape function in the frequency domain.

The present inventors showed that when applying a n-step spectral phase, a coherent control of the SHG spectrum can be achieved, imposing a complete dip in the SHG, which is an outcome of complete destructive interference between the convolution of the interacting fundamental waves. This demonstrates that the technique of the present embodiments can be utilized in many pulse-shaping applications, particularly for nonlinear spectroscopy and imaging.

Figure 1A:
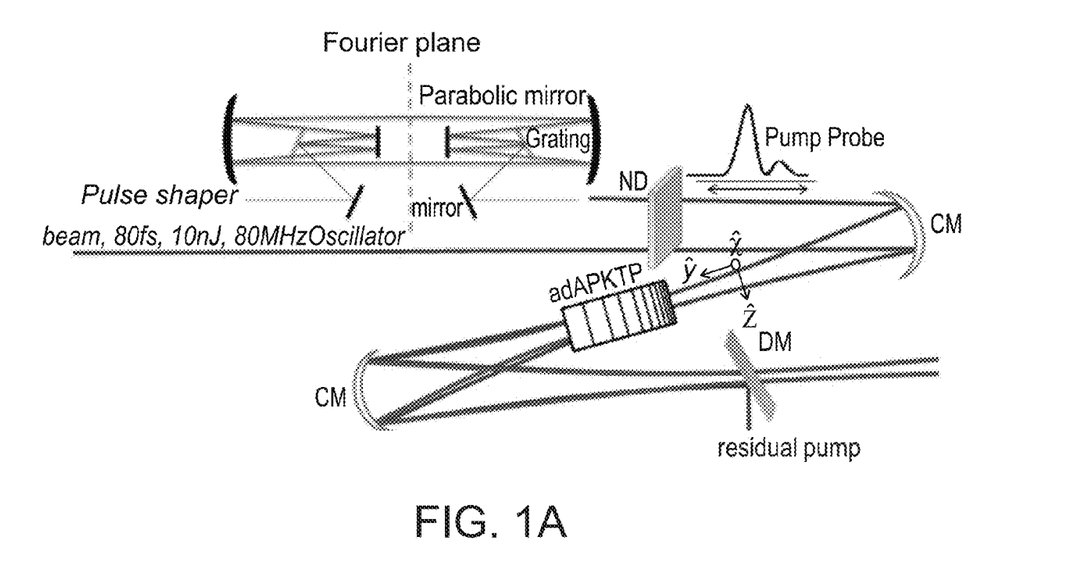
FIG. 1A is a schematic illustration of an experimental setup, used in experiments performed according to some embodiments of the present invention.

The experimental setup, illustrated in FIG. 1A, consists of a 80 MHz repetition rate tunable coherent oscillator between 690 nm to 1040 nm (Mai-Tai) that served as the pump pulses, delivering 17.5 nm full width half maximum (FWHM) ~70 fs transform limited pulses, with energies spanning between 10-30 nJ. The pump pulse then passes through JENOPTIK 640D spatial light modulator (SLM) in the range of 430-1600 nm, allowing to alter the pump pulse spectral phase and temporal behavior before it is focused into an adiabatically aperiodically poled KTP (adAPKTP) crystal. The residual pump and the generated SHG were separated using a dichroic mirror around 950 nm. The spectrum of the SHG pulse was measured using Avantes spectrometer and is displayed in the right lower image of FIG. 1D, thus demonstrating an efficient conversion efficiency all over the pump spectra.

In the analysis, a three-dimensional generalization of the fully nonlinear dynamical equations was used, dictating nonlinear conversion of any three wave mixing and in particular the depleted ultrashort SHG. Two photon absorption as well as Kerr effects of the fundamental pump and the generated SHG was also taken into account. Since the SHG process occurred within the Rayleigh range of the pump pulse, spatial diffraction can be neglected, thus eliminating interaction between different areas of the transverse intensity profile.

The following three-dimensional generalization of three-wave mixing process, and in particular the SHG equations were applied for predicting the SHG process behavior of both ultrashort pulses and long pulses:

$$\frac{\partial B_{SHG}(r, z, t)}{\partial z} + i\mathcal{F}^{-1}(\beta(\omega + \omega_{SHG})B_{SHG}(r, z, \omega)) =$$

$$-i\chi(z)\mathcal{F}^{-1}\left(\frac{\omega + \omega_{SHG}}{n(\omega + \omega_{SHG})c}\mathcal{F}(B_p^2(r, z, t))\right) - \frac{\beta}{2}I_{SHG}(r, z, t)B_{SHG}(r, z, t)$$

$$\frac{\partial B_p(r, z, t)}{\partial z} + i\mathcal{F}^{-1}(\beta(\omega + \omega_p)B_p(r, z, \omega)) =$$

$$-i\chi(z)\mathcal{F}^{-1}\left(\frac{\omega + \omega_p}{n(\omega + \omega_p)c}\mathcal{F}(B_{SHG}(r, z, t)B_p^*(r, z, t))\right)$$

where $B_{SHG}(r,z,\omega)$ and $B_p(r,z,\omega)$ are the electric field spectral density amplitudes of the pulses, $B_{SHG}(r,z,t)$ and $B_p(r,z,t)$ are the electric field modulation around the pulses central frequency, and $\beta(\omega)$ is the dispersion relation. All physical variables these equations are defined in Ref. [23].

These equations can be used for determining whether a crystal is suitable for the SHG conversion of the present embodiments. The grating function or periodicity is determined, for example, by microscopic analysis of the crystal. The grating function can then be substituted it into these equations and the quantity $B_{SHG}$ can be calculated for each of a plurality of wavelengths. The amplitude of $B_{SHG}$ indicates the amount of generated SHG. The procedure can be executed for each of a plurality of locations of the crystal to allowing behavior of both ultrashort pulses and long pulses. The spectrum and intensity of $B_{SHG}$, which typically scales the bandwidth and intensity of $B_p$, can then be measured. The bandwidth of the measured $B_{SHG}$ can be compared with the reduced number of photon in the pump, in term of bandwidth (spectrum) or in term of intensity, or in term of both bandwidth and intensity.

Figure 1B:
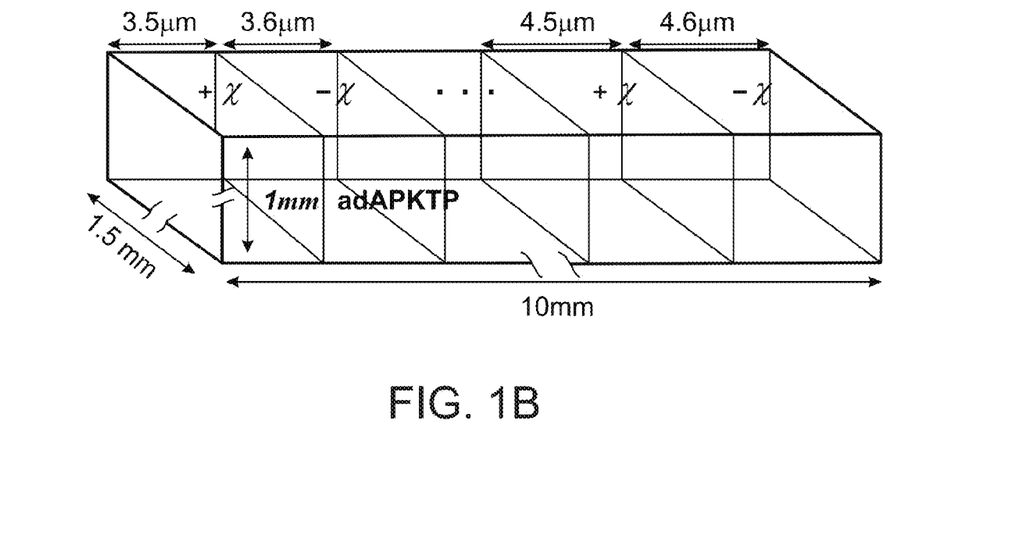
FIG. 1B is a schematic illustration of a crystal used in the experimental setup of FIG. 1A.
Figure 1C:
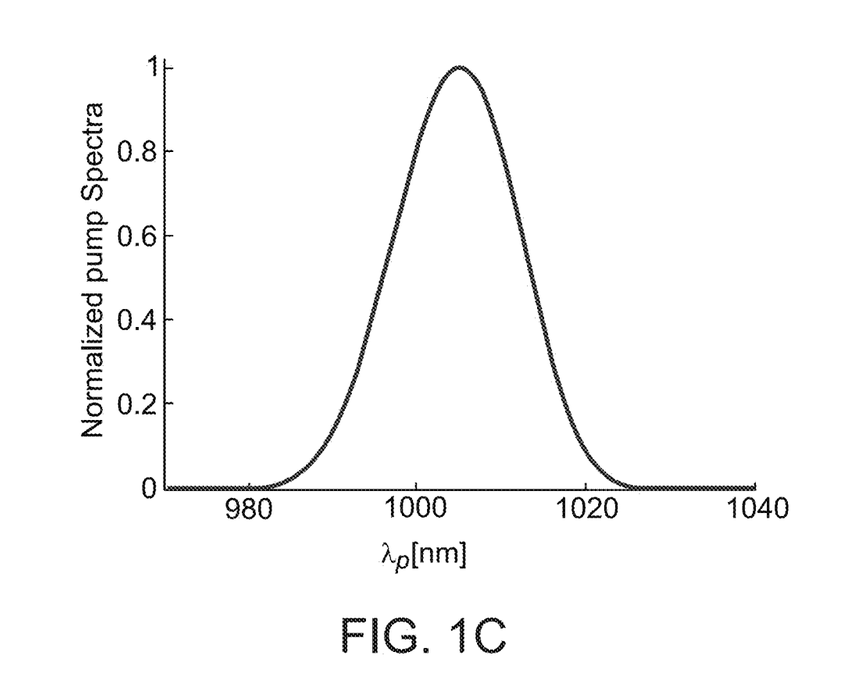
FIGS. 1C and 1D show the measured pump normalized spectra, and SHG normalized spectra, respectively, as obtained in experiments performed according to some embodiments of the present invention.
Figure 1D:
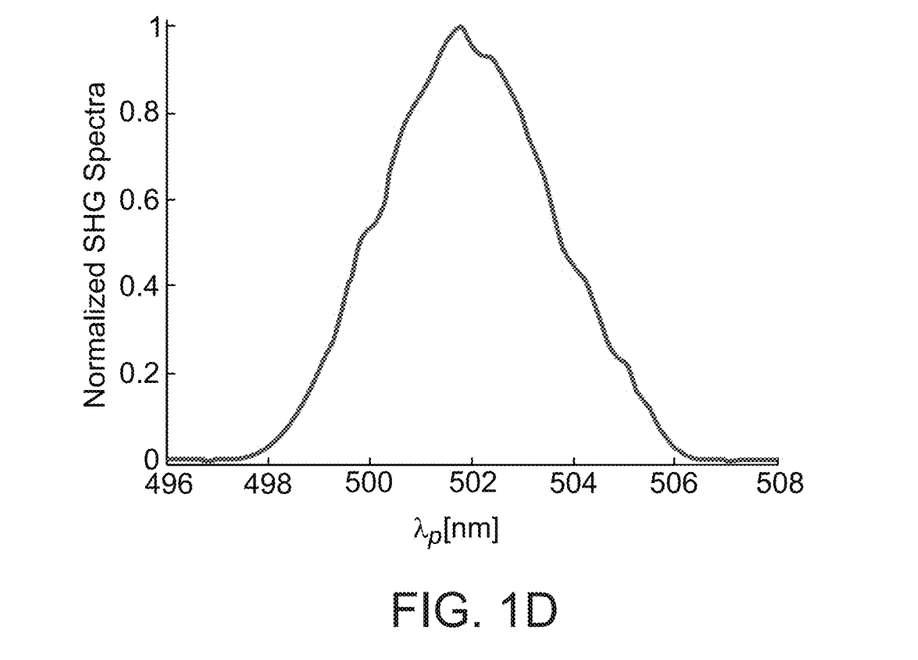

FIG. 1A illustrates the adiabatic SHG experimental apparatus. The programmable 4-f of the quadratic phase tunable pulse shaper is composed of a pair of diffraction gratings with 600 lines/mm and a pair of parabolic curve mirror. Two-dimensional SLM was placed at the Fourier plane and was used as a dynamic filter for spectral phases. ND—neutral density filter, CM—curved mirror, DM—dichroic mirror, adAPKTP—adiabatically aperiodically poled KTP. FIG. 1B illustrates the adAPKTP crystal. FIG. 1C shows the measured pump normalized spectra, and FIG. 1D shows SHG normalized spectra. The absolute phase function was centered on $\omega_p$, enabling controlling time separation spatiotemporal parts in the signal.

In the present example, the crystal was designed for wavelengths from about 980 nm to about 1070 nm, and the following grating function $K_g(z)$ was employed:

$$K_g(z)=(118.2z_{cm}^3-45.2z_{cm}^2-997.9z_{cm}+7957.1)[cm^{-1}],$$

and z spans all along the crystal length. In the experiments, the length of the crystal was 10 mm so that z∈[−5 mm, 5 mm], but any length can be employed, for example, from about 1 mm to about 50 mm.

The periodicity $\Lambda(z)$ was calculated by $$\Lambda(z) = \frac{2\pi}{K_g(z)}$$

or any higher order of it. The polynomial expression which was used in this example, and which is not to be considered as limiting, varies from ~13950 [1/cm] at one edge (Z=−L/2, where L is the length of the crystal) to 17950 [1/cm] at the other edge (Z=L/2)

Incorporation of the measured FROG pump pulse and the measured 40 μm FWHM Gaussian beam profile to the simulation, yielded agreement with experimental for KTP results for $$\beta = 4\left[\frac{cm}{GW}\right],$$

in correspondence with the nonlinear coefficient obtained in Ref. [22]. In other materials the value of β can be different.

The energy conversion efficiency of the crystal is defined to be the ratio between the generated SHG pulse energy to the pump pulse energy:

$$\eta = \frac{E_{SHG}(z_{final})}{E_p(z_{initial})}$$

Where $z_{final}$ and $z_{initial}$ are the locations of the crystal output and input facets, respectively. The conversion efficiency measurements as function of the central pump wavelength are presented as red dots in FIG. 2A. Although conversion efficiency measurements were limited in the range of 970-1030 nm due to source limitations, the adiabatic design is capable of an efficient frequency doubling within a bandwidth of 80 nm, shown as blue solid line.

Figure 2A:
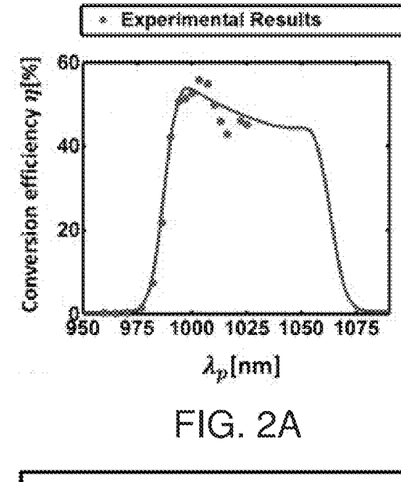
FIGS. 2A and 2B show dependence of frequency conversion with pump central wavelength and energy, as obtained in experiments performed according to some embodiments of the present invention.
Figure 2B:
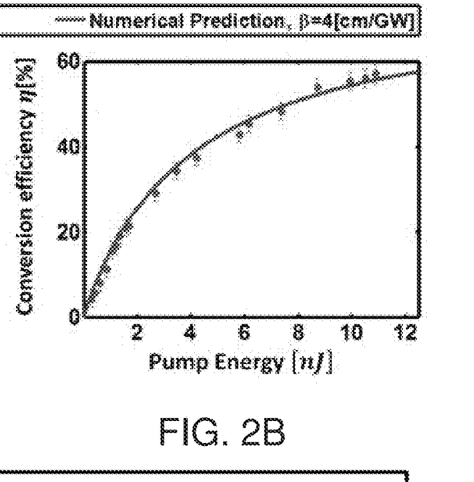

FIGS. 2A and 2B show the dependence of frequency conversion with pump central wavelength and energy. FIG. 2A shows conversion efficiency dependence with pump central wavelength, and FIG. 2B shows conversion efficiency as a function of pump energy centered at 1005 nm wavelength. Deviation between the loss-free numerical predication [22] and new experimental results can be attributed to two photon absorption (TPA).

A broadband 4-f pulse shaper was added based on computer controlled SLM positioned at its Fourier plane. First, a varying spectral quadratic phase was used as an aligned tunable compressor that can control of the GDD of the fundamental, which influence also SHG output spectral distribution. The architecture for the 4-f pulse shaper was includes two pieces of 600 g/mm ruled grating which disperse the light angularity into a telescope based pair of 913.4 mm ROC parabolic mirrors, which fit especially for a 4f-arrangement or in a chirped pulse amplification system.

Figure 3A:
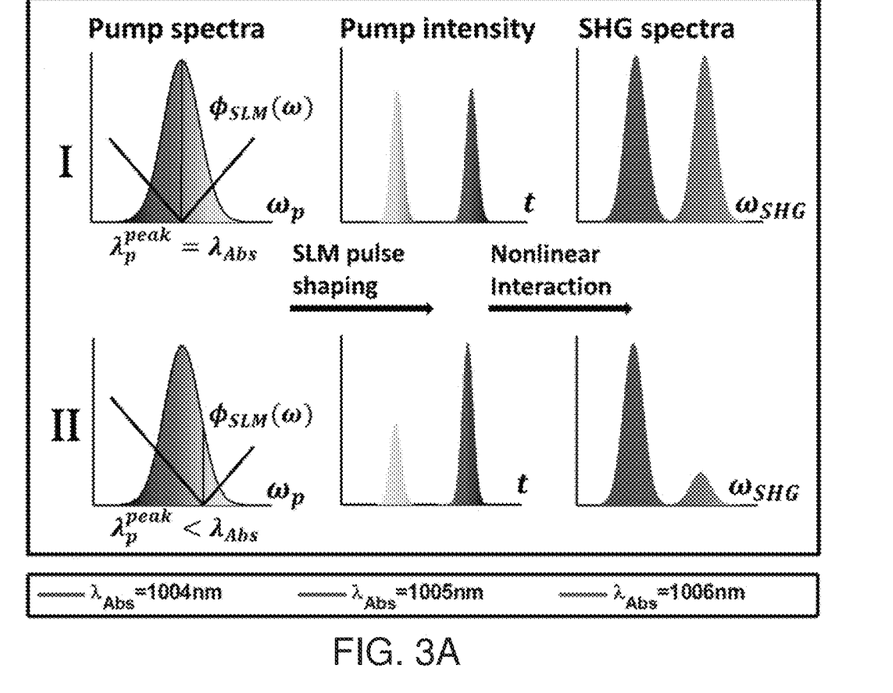
FIGS. 3A-C show asymmetrical absolute-value spectral phase in adiabatic SHG domain centered on different wavelengths, as obtained in experiments performed according to some embodiments of the present invention.
Figure 3B:
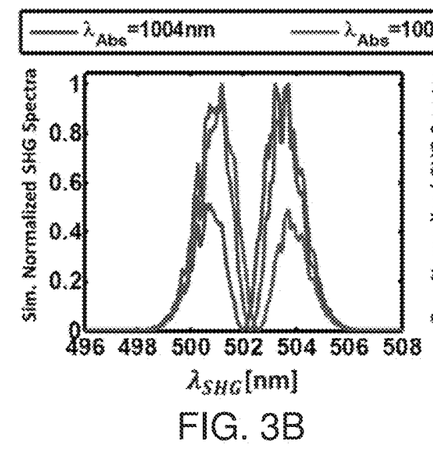
Figure 3C:
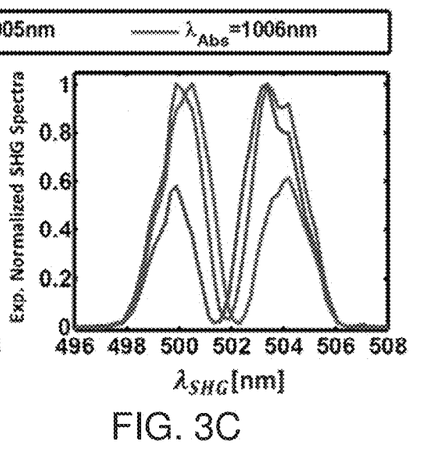

The pump probe apparatus were implemented by applying an absolute-valued spectral phase centered within the bandwidth of the fundamental spectral phase, denoted by $\omega_{Abs}$: $\phi \propto |\omega - \omega_{Abs}|$. The linear phase slope, different parts of the pump spectra are translated to opposite directions in the time domain, therefore enabling splitting the incoming pump pulse into two localized pump pulses, with extinction ratio and delay determined by $\omega_{Abs}$ and the absolute phase slope. The idler spectra dependence with $$\lambda_{Abs} = \frac{2\pi c}{\omega_{Abs}}$$

is presented in FIGS. 3A-C for an input hyperbolic secant pump pulse centered on 1005 nm. When applying the abs-valued shape spectral phase in the center of the pump pulse $\lambda_{Abs}$=1005 nm, as shown in FIG. 3(A-I), the initial pump pulse splits to two pulses with the same peak intensity, resulting in a symmetrical normalized pump probe SHG spectra. When the abs-valued shape phase is not symmetrical regarding the pump central frequency, as shown in FIG. 3(A-II), the generated a-symmetrical pump pulses results in a-symmetrical SHG spectra.

A π-step spectral phase was applied. As a result of destructive interference between the different frequency components, the π-step induces a SHG/SFG pulses with a spectral dip at a different wavelength. Due to the mathematical similarity between the perturbative solution of two photon absorption process in a non-resonant two level quantum systems and the instantaneous SHG process (where time scaling t is replaced by propagation length in crystal at the z axis is perform), most of the coherent control schemes that were applied in atomic physics community can be adopted in pulse-shaped SHG outcome using the ASHG nonlinear crystal. In order to demonstrate shaping of the SHG spectra, π-step function was also applied at different locations on the pump spectral phase.

The case of second harmonic generation of ultrashort pulse with an electric field distribution of ε(t) was considered. From second order non-resonant time-dependent perturbation theory, the instantaneous second harmonic spectral field can be found by the convolution of the fundamental spectral field $\tilde{\epsilon}(\Omega)=F \cdot T\{\epsilon(t)\}$ [10]:

$$\varepsilon_{SHG}(\omega)=|\int_{-\infty}^{\infty}\epsilon^2(t)\cdot\exp(i\omega_0 t)dt|^2=|\int_{-\infty}^{\infty}\tilde{\epsilon}(\Omega)\tilde{\epsilon}(\omega_0-\Omega)d\Omega|^2$$

where $\omega_0$ is the pump electric field envelope modulation frequency.

A change of variables as $$\Omega \to \Omega + \frac{\omega_0}{2},$$

and write explicitly $\tilde{\epsilon}(\Omega) = A(\Omega)\exp[i\Phi(\Omega)]$, provides:

$$\varepsilon_{SHG}(\omega) = \left| \int_{-\infty}^{\infty} A\left(\frac{\omega_0}{2} + \Omega\right) A\left(\frac{\omega_0}{2} - \Omega\right) \cdot \exp\left[i\left\{\Phi\left(\frac{\omega_0}{2} + \Omega\right) + \Phi\left(\frac{\omega_0}{2} - \Omega\right)\right\}\right] d\Omega \right|^2$$

where $A(\omega)$ and $\Phi(\omega)$ are the spectral amplitude and spectral phase, respectively.

FIGS. 3A-C show asymmetrical absolute-value spectral phase in the adiabatic SHG domain centered on different $\omega_{Abs}$ (representing in wavelength parameter $\lambda$(nm)), which is the center of the frequency separation. FIG. 3A illustrates the absolute phase concept, FIG. 3B shows the simulated normalized SHG spectra, and FIG. 3C shows the experimental normalized SHG spectra.

The equation reflects that the SHG/SFG occurs for all pairs of photons with frequencies which adds to $\omega_0$ and lie within the spectrum of the exciting pulse. When the phase cancels $$\left(\Phi\left(\frac{\omega_0}{2} + \Omega\right) + \Phi\left(\frac{\omega_0}{2} - \Omega\right) = 0\right)$$

and for a symmetric amplitude $A(\omega)$ with respect to $$\frac{\omega_0}{2},$$

the amount of SHG is maximized. This same behavior happens for the instantaneous SHG/SFG, where the transform limit pulse ($\Phi(\Omega)=0$) and every anti-symmetric phase compared to $$\frac{\omega_0}{2}$$

results in the same SHG rate. Specifically, the anti-symmetric phase can significantly affect the shape of the pulse to have much smaller amplitude and a much longer duration without affecting the SHG.

The experimental results of applying an anti-symmetric phase of $\pi$-step each time at a different wavelength location at the SLM, show different SHG/SFG spectra for each measurement. Destructive interference appears in the SHG/SFG when the step is not in the middle of the spectrum, and can lead for complete destructive interference of the SHG/SFG signal at specific wavelength. The calculation can be generalized to any anti-symmetric phase.

Figure 4A:
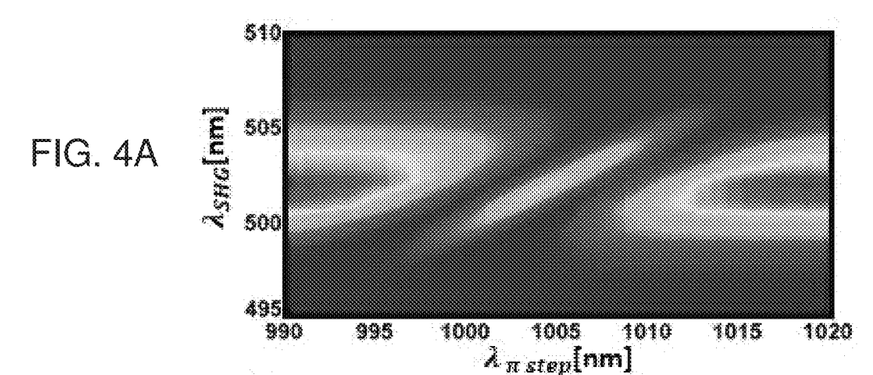
FIGS. 4A and 4B show experimental and simulation results of broadband adiabatic SHG conversion obtained when exciting the crystal of FIG. 1B by a pulse with varying spectral phase of it-step, in accordance with some embodiments of the present invention.
Figure 4B:
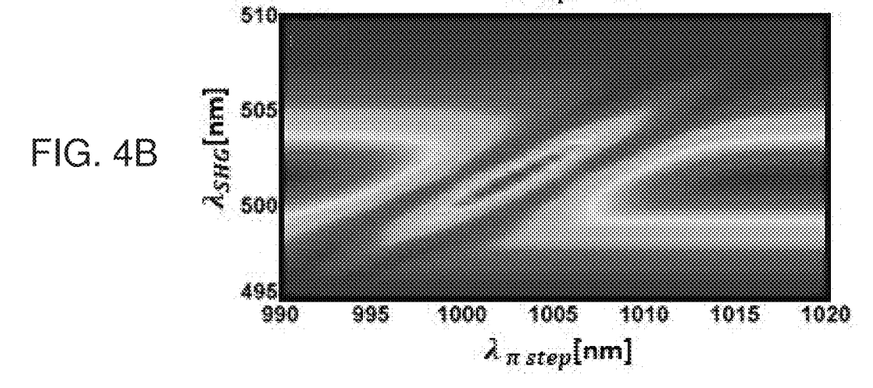

FIGS. 4A and 4B show the experimental results as well as simulations of broadband adiabatic SHG conversion when exciting the adiabatic SHG crystal by a pulse with varying spectral phase of $\pi$-step, as a function of the step position. The simulation results were obtained by inserting the measured spectrum of the original pulse. Good agreement is obtained between the experimental results and the numerical simulations. FIG. 4A shows the experimental results and FIG. 4B shows the simulation results.

This Example described an experimentally investigation of the performance of an adiabatic aperiodically poled KTP crystal using conventional femtosecond high rep.-rate oscillator in the nJ energy level regime. While the present Example was described with a particular emphasis to a crystal made of KTP, it is to be understood that the crystal can be made of other materials, not necessarily KTP. Representative example include, without limitation, LiNbO3, Magnesium doped LiNbO3, SLT, Gallium-Arsenide and Gallium Phosphide. This Example showed that the efficient wideband ultrashort second harmonic generation allows broadband pulse shaping. This Example experimentally demonstrated acceptance bandwidth higher than 40 nm with nJ level excitation. This Example showed that the wideband operation of the adiabatic crystal design allows performing pulse shaping manipulation on the fundamental pulses, with no restriction imposed by the limited bandwidth of a conventional birefringence or periodic crystals designs. SLM dependent tunable pump probe was given as an example, demonstrating altering the pump probe spectral and temporal characteristics without the need of realigning the experimental apparatus.

This Example showed that the SHG/SFG spectrum can be manipulated by tailoring the shape of the exciting ultrashort pulse and the broad spectral conversion response of the adiabatic SHG nonlinear crystal.

In this Example conversion of bandwidth of 980-1050 nm was demonstrated. Conversion of other bandwidths is also contemplated. Embodiments of the present invention include conversion of any bandwidths, optionally and preferably an optical bandwidth, such as, but not limited to, a bandwidth in the UV range, bandwidth in the visible range, bandwidth in the IR range, bandwidth in the NIR range, a bandwidth in the MIR rang, a bandwidth in the FIR range, and a bandwidth spanning over, or bridging between, two or more of these ranges.

The effect of a spectral phase modulation of abs-value and a $\pi$-step spectral phase was investigated, demonstrating spectrum shaping as well as complete destructive interference in the SHG. This Example also showed that certain spectral phase modulation leads to long pulses that induce SHG that is effectively as transform-limited pulses.

Example 2

Exemplary Polynomial Functions

This Example list exemplary polynomial functions, according to some embodiments of the present invention. For each of the exemplary polynomial functions of z that are listed in this example, the crystal grating function of the crystal of system 10 can be within less than p % from the respective polynomial function of z, for any value of z within the length of said crystal, wherein p equals 20 or 15 or 10 or 5.

Tables 1-3 list coefficient ranges suitable for use as a polynomial function according to some embodiments of the present invention. In Tables 1-3, L represents the length of the crystal for which the respective polynomial function is best suited, in millimeters, $\lambda$(min) and $\lambda$(max) represent the range of wavelengths for which the respective polynomial function is best suited, in nm, and $a_n$(min) and $a_n$(max), n=0, . . . , 6, represent the range of the coefficient, in units of $cm^{-(n+1)}$, of the nth power of the coordinate z (for example, the first entry of Table 1 describes a fourth power polynomial function of the form $a_0+a_1z+a_2z^2+a_3z^3+a_4z^4$, where $a_0$ is from about 2908 cm$^{-1}$ to about 3554 cm$^{-1}$, $a_1$ is from about −905 cm$^{-2}$ to about −741 cm$^{-2}$, $a_2$ is from about −226 cm$^{-3}$ to about −185 cm$^{-3}$, $a_3$ is from about 302 cm$^{-4}$ to about 369 cm$^{-4}$, and $a_4$ is from about −927 cm$^{-5}$ to about −759 cm$^{-5}$).

The polynomial functions in Table 1 are best suited for Lithium Niobide (LiNbO3 Mg-doped) crystals, the polynomial functions in Table 2 are best suited for a Lithium Tantalite (SLT) crystals, and the polynomial functions in Table 3 are best suited for a KTP crystals.

The functions in Tables 1-3 were calculated in iterative manner as further detailed hereinabove. One of ordinary skills in the art, provided with the details described herein would know how to calculate functions for other crystals, and other wavelength ranges.

TABLE 1

| L | λ(min) λ(max) | a$_6$(min) a$_6$(max) | a$_5$(min) a$_5$(max) | a$_4$(min) a$_4$(max) | a$_3$(min) a$_3$(max) | a$_2$(min) a$_2$(max) | a$_1$(min) a$_1$(max) | a$_0$(min) a$_0$(max) |
|---|---|---|---|---|---|---|---|---|
| 2 | 1535 |  |  | −927 | 302 | −226 | −905 | 2908 |
|   | 1575 |  |  | −759 | 369 | −185 | −741 | 3554 |
| 2 | 980 |  |  |  | 2405 | 772 | −3095 | 3083 |
|   | 1070 |  |  |  | 2939 | 944 | −2533 | 3768 |
| 2 | 1350 |  |  |  | 2357 | 454 | −2791 | 3721 |
|   | 1450 |  |  |  | 2881 | 554 | −2283 | 4547 |
| 2 | 775 |  |  |  | 4313 | 771 | −5170 | 7102 |
|   | 825 |  |  |  | 5271 | 943 | −4230 | 8680 |
| 2 | 980 |  |  |  | 6683 | 1508 | −8342 | 9240 |
|   | 1070 |  |  |  | 8169 | 1843 | −6826 | 11294 |
| 2 | 1100 |  |  |  |  | 1230 | −6023 | 6475 |
|   | 1200 |  |  |  |  | 1504 | −4928 | 7913 |
| 5 | 1050 |  | 15148 | −9243 | 922 | 4120 | −7897 | 4823 |
|   | 1650 |  | 18514 | −7563 | 1126 | 5036 | −6461 | 5895 |
| 5 | 1100 |  |  | −6908 | 1530 | 2771 | −6485 | 4772 |
|   | 1580 |  |  | −5652 | 1870 | 3387 | −5306 | 5832 |
| 5 | 1800 |  |  |  | 81 | 62 | −618 | 1966 |
|   | 2100 |  |  |  | 99 | 76 | −506 | 2402 |
| 5 | 2000 |  |  | −50 | 52 | 14 | −417 | 1731 |
|   | 2500 |  |  | −41 | 63 | 17 | −341 | 2115 |
| 5 | 2400 |  |  | 2.5 | −5 | −50 | 1579 | 1579 |
|   | 3000 |  |  | 3.5 | −4 | −41 | 1930 | 1930 |
| 5 | 775 |  |  | 275 | 123 | −2068 | 7102 | 7102 |
|   | 825 |  |  | 337 | 151 | −1692 | 8680 | 8680 |
| 5 | 1250 |  |  | 158 | 55 | −1221 | 4553 | 4553 |
|   | 1350 |  |  | 193 | 67 | −999 | 5565 | 5565 |
| 5 | 1490 |  |  |  | −86 | −711 | 2948 | 2948 |
|   | 1610 |  |  |  | −70 | −581 | 3604 | 3604 |
| 5 | 1520 |  |  | −25 | 21 | −39 | −391 | 2920 |
|   | 1580 |  |  | −21 | 25 | −32 | −320 | 3568 |
| 5 | 1530 |  |  |  |  | −48 | −158 | 2907 |
|   | 1570 |  |  |  |  | −40 | −130 | 3553 |
| 10 | 790 |  |  |  |  | 25 | −933 | 6641 |
|    | 840 |  |  |  |  | 31 | −763 | 8117 |
| 10 | 980 |  |  |  | 14 | 122 | −1609 | 9159 |
|    | 1070 |  |  |  | 18 | 149 | −1317 | 11195 |
| 10 | 1500 |  |  | −3.5 | 5 | 6 | −287 | 2912 |
|    | 1600 |  |  | −2.5 | 7 | 8 | −235 | 3559 |
| 10 | 800 |  |  |  |  | 54 | −1563 | 5810 |
|    | 900 |  |  |  |  | 66 | −1279 | 7102 |
| 10 | 1510 |  |  |  |  | −81 | −264 | 2916 |
|    | 1570 |  |  |  |  | −67 | −216 | 3564 |
| 10 | 1510 |  |  |  |  | −83 | −431 | 2927 |
|    | 1590 |  |  |  |  | −68 | −353 | 3577 |

TABLE 2

| L | λ(min) λ(max) | a$_6$(min) a$_6$(max) | a$_5$(min) a$_5$(max) | a$_4$(min) a$_4$(max) | a$_3$(min) a$_3$(max) | a$_2$(min) a$_2$(max) | a$_1$(min) a$_1$(max) | a$_0$(min) a$_0$(max) |
|---|---|---|---|---|---|---|---|---|
| 5 | 1520 |  |  |  | 18 | −36 | −352 | 2672 |
|   | 1580 |  |  |  | 22 | −30 | −288 | 3266 |
| 5 | 775 |  |  |  | 153 | 162 | −1680 | 6007 |
|   | 825 |  |  |  | 187 | 198 | −1374 | 7341 |
| 10 | 980 |  |  |  | 14 | 15 | −469 | 2673 |
|    | 1070 |  |  |  | 18 | 19 | −383 | 3267 |
| 10 | 985 |  |  |  | 14 | 98 | −1357 | 7952 |
|    | 1070 |  |  |  | 17 | 120 | −1111 | 9719 |
| 10 | 790 |  |  |  | 17 | 35 | −765 | 5627 |
|    | 840 |  |  |  | 21 | 43 | −626 | 6877 |

TABLE 2-continued

| L | $\lambda$(min) $\lambda$(max) | $a_6$(min) $a_6$(max) | $a_5$(min) $a_5$(max) | $a_4$(min) $a_4$(max) | $a_3$(min) $a_3$(max) | $a_2$(min) $a_2$(max) | $a_1$(min) $a_1$(max) | $a_0$(min) $a_0$(max) |
|---|---|---|---|---|---|---|---|---|
| 5 | 1050 | −17975 | 13691 | −6976 | 920 | 3721 | −7267 | 4464 |
|   | 1650 | −14707 | 16733 | −5708 | 1124 | 4547 | −5945 | 5456 |
| 10 | 1800 |  |  | −4.5 | 9 | −1.5 | −230 | 1889 |
|   | 2100 |  |  | −3.5 | 11 | −0.5 | −188 | 2309 |

TABLE 3

| L | $\lambda$(min) $\lambda$(max) | $a_6$(min) $a_6$(max) | $a_5$(min) $a_5$(max) | $a_4$(min) $a_4$(max) | $a_3$(min) $a_3$(max) | $a_2$(min) $a_2$(max) | $a_1$(min) $a_1$(max) | $a_0$(min) $a_0$(max) |
|---|---|---|---|---|---|---|---|---|
| 10 | 780 |  |  |  | 2.5 | 274 | −2883 | 12215 |
|   | 950 |  |  |  | 3.5 | 334 | −2359 | 14929 |
| 10 | 980 |  |  |  | 18 | 66 | −1064 | 7132 |
|   | 1070 |  |  |  | 22 | 80 | −870 | 8716 |

Tables 4-6 list specific polynomial functions suitable for the above crystals and wavelength ranges. The polynomial functions in Table 4 are best suited for Lithium Niobide (LiNbO3 Mg-doped) crystals, the polynomial functions in Table 5 are best suited for a Lithium Tantalite (SLT) crystals, and the polynomial functions in Table 6 are best suited for a KTP crystals.

TABLE 4

| Length of Crystal | Wavelength range | Polynomial Function |
|---|---|---|
| 2 mm | 1535-1575 | $K_g(z) = -843z^4 + 335z^3 - 205z^2 - 823z^1 + 3231$ |
| 2 mm | 980-1070 | $K_g(z) = 2672z^3 + 858z^2 - 2814z^1 + 3425$ |
| 2 mm | 1350-1450 | $K_g(z) = 2619z^3 + 504z^2 - 2537z^1 + 4134$ |
| 2 mm | 775-825 | $K_g(z) = 4792z^3 + 857z^2 - 4700z^1 + 7891$ |
| 2 mm | 980-1070 | $K_g(z) = 7426z^3 + 1675z^2 - 7584z^1 + 10267$ |
| 2 mm | 1100-1200 | $K_g(z) = 1367.17z^2 - 5475z^1 + 7194$ |
| 5 mm | 1050-1650 | $K_g(z) = 16831z^5 - 8403z^4 + 1024z^3 + 4578z^2 - 7179z^1 + 5359$ |
| 5 mm | 1100-1580 | $K_g(z) = -6280z^4 + 1700z^3 + 3079z^2 - 5895z^1 + 5302$ |
| 5 mm | 1800-2100 | $K_g(z) = 90z^3 + 69z^2 - 562z^1 + 2184$ |
| 5 mm | 2000-2500 | $K_g(z) = -45z^4 + 57.34z^3 + 15z^2 - 379z^1 + 1923$ |
| 5 mm | 2400-3000 | $K_g(z) = 3z^3 - 4.74z^2 - 45.87z^1 + 1754.63$ |
| 5 mm | 775-825 | $K_g(z) = 306z^3 + 137z^2 - 1880z^1 + 7891$ |
| 5 mm | 1250-1350 | $K_g(z) = 175z^3 + 61z^2 - 1110z^1 + 5059$ |
| 5 mm | 1490-1610 | $K_g(z) = -78z^2 - 646z^1 + 3276$ |
| 5 mm | 1520-1580 | $K_g(z) = -23z^4 + 23z^3 - 35z^2 - 355z^1 + 3244$ |
| 5 mm | 1530-1570 | $K_g(z) = -44z^2 - 144z^1 + 3230$ |
| 10 mm | 790-840 | $K_g(z) = 28z^2 - 848z^1 + 7379$ |
| 10 mm | 980-1070 | $K_g(z) = 16z^3 + 135z^2 - 1463z^1 + 10177$ |
| 10 mm | 1500-1600 | $K_g(z) = -3z^4 + 6z^3 + 7z^2 - 261z^1 + 3235$ |
| 10 mm | 800-900 | $K_g(z) = 60z^2 - 1421z^1 + 6456$ |
| 10 mm | 1510-1570 | $K_g(z) = -74z^2 - 240z^1 + 3240$ |
| 10 mm | 1510-1590 | $K_g(z) = -75z^2 - 392z^1 + 3252$ |

TABLE 5

| Length of Crystal | Wavelength range | Polynomial Function |
|---|---|---|
| 5 mm | 1520-1580 | $K_g(z) = 20z^3 - 33z^2 - 320z^1 + 2969$ |
| 5 mm | 775-825 | $K_g(z) = 170z^3 + 180z^2 - 1527z^1 + 6674$ |
| 10 mm | 980-1070 | $K_g(z) = 16z^3 + 17z^2 - 426z^1 + 2970$ |
| 10 mm | 985-1070 | $K_g(z) = 15z^3 + 109z^2 - 1234z^1 + 8835$ |
| 10 mm | 790-840 | $K_g(z) = 19.15z^3 + 39z^2 - 695z^1 + 6252$ |
| 5 mm | 1050-1650 | $K_g(z) = -16341z^6 + 15212z^5 - 6342z^4 + 1022z^3 + 4134z^2 - 6606z^1 + 4960$ |
| 10 mm | 1800-2100 | $K_g(z) = -4z^4 + 10z^3 - 1z^2 - 209z^1 + 2099$ |

TABLE 6

| Length of Crystal | Wavelength range | Polynomial Function |
|---|---|---|
| 10 mm | 780-950 | $K_g(z) = 3z^3 + 304z^2 - 2621z^1 + 13572$ |
| 10 mm | 980-1070 | $K_g(z) = 20z^3 + 73z^2 - 967z^1 + 7924$ |

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

REFERENCES

[1] J.-C. Diels and W. Rudolph, "Ultrashort Laser Pulse Phenomena: Fundamentals, Techniques, and Applications on a Femtosecond Time Scale", Academic Press, 2nd Edition (2006).
[2] H. A. Zewail, "Femtochemistry: Atomic-scale dynamics of the chemical bond using ultrafast lasers." Angewandte Chemie International Edition 39 2586-2631 (2000).
[3] A. M. Weiner, "Ultrafast Optics", Wiley (2008).
[4] L. A. Cavalieri, et al. "Attosecond spectroscopy in condensed matter." Nature 449 1029-1032 (2007).
[5], A. V. Kimel et al. "Ultrafast non-thermal control of magnetization by instantaneous photomagnetic pulses." Nature 435, 655-657 (2005).
[6] N. Dudovich, D. Oron, and Y. Silberberg. "Quantum Coherent Control for Nonlinear Spectroscopy and Microscopy." Annual Rev. of Phys. Chem. 60, 277-292 (2009).
[7] R. Trebino, "Frequency-resolved optical gating: the measurement of ultrashort laser pulses",
Springer Science & Business Media (2012).
[8] V. V Lozovoy, I. Pastirk, and M. Dantus, "Multiphoton intrapulse interference. IV. Ultrashort laser pulse spectral phase characterization and compensation." Opt. Letters 29, 775-777 (2004).
[9] C. Iaconis, and I. A. Walmsley, "Spectral phase interferometry for direct electric-field reconstruction of ultrashort optical pulses." Opt. Letters 23, 792-794 (1998).
[10] R. W. Boyd, "Nonlinear Optics". Burlington: Academic Press, 3rd Edition (2011).
[11] H. Suchowski, B. Bruner, A. Arie and Y. Silberberg, "Broadband nonlinear frequency conversion." Opt. and Phot. News 21, 36-41 (2010).
[12] H. Suchowski, G. Porat, and A. Arie, Laser and Phot. Rev., 8, 333-367 (2014).
[13] C. Heese et al. "75 MW few-cycle mid-infrared pulses from a collinear apodized APPLN-based OPCPA." Opt. Express 20, 6888-26894 (2012).
[14] H. Suchowski, V. Prabhudesai, D. Oron, A. Arie and Y. Silber berg, Opt. Express 17 12731-12740 (2009).
[15] C. Heese, C. R. Phillips, L. Gallmann, M. M. Fejer and U. Keller, Opt. Letters 35, 2340-2342 (2010).
[16] C. Heese, C. R. Phillips, L. Gallmann, M. M Fejer and U. Keller, Opt. Express 20, 18066-18071 (2012).
[17] O. Yaakobi, L. Caspani, M. Clerici, F. Vidal and R. Morandotti, Opt. Express 21, 1623-1632 (2013).
[18] H. Suchowski, P. R. Krogen, S. W. Huang, F. X. Kartner and J. Moses, Opt. Express 21, 28892-28901 (2013).
[19] P. Krogen, H. Suchowski, H. Liang, N. Flemens, K.-H. Hong, F. X. Kärtner, J. Moses, "Generation and Arbitrary Shaping of Intense Single-Cycle Pulses in the Mid-Infrared", Nat. Photonics, 222-226 (2017).
[20] G. Porat and Ady Arie. "Efficient, broadband, and robust frequency conversion by fully nonlinear adiabatic three-wave mixing." JOSA B 30 1342-1351 (2013).
[21] C. R. Phillips, C. Langrock, D. Chang, Y. W. Lin, L. Gallmann, M. M. Fejer, "Apodization of chirped quasi-phasematching devices", JOSA B, 30, 1551-1568 (2013).
[22] A. Leshem, G. Meshulam, G. Porat G and A. Arie, Optics Letters, 41 1229-1232 (2016).
[23] V. A. Mikhailov, 0. P. Shaunin, I. A. Shcherbakov, V. A. Maslov, "Nonlinear absorption in KTP crystals", 27, 356-359 (1997).
[24] D. Meshulach, Y. Silberberg, "Coherent quantum control of two-photon transitions by a femtosecond laser pulse", Nature 396, 239-242 (1998).
[25] D. Meshulach and Y. Silberberg, "Coherent quantum control of multiphoton transitions by shaped ultrashort optical pulses", Phys. Rev. A, 60, 1287 (1999).

What is claimed is:

1. A system for frequency conversion, comprising a laser source and a harmonic generation crystal, wherein said laser source is configured to produce optical pulse energy of less than 100 μJ, and wherein said harmonic generation crystal comprises a structure characterized by a nonlinear susceptibility, and a crystal grating period which adiabatically varies along said longitudinal direction in a manner that said crystal grating period is inversely proportional to a crystal grating function of a coordinate z measured along said longitudinal direction;
wherein said crystal grating function is selected to provide conversion efficiency that varies by at most ±20% over a bandwidth of said pulses.

2. The system of claim 1, wherein said laser source is configured to produce optical pulse energy of less than 10 μJ.

3. The system of claim 1, wherein said laser source is configured to produce optical pulse energy of less than 1 μJ.

4. The system of claim 1, wherein said laser source is configured to produce optical pulse energy of less than 0.1 μJ.

5. The system according to claim 1, wherein said adiabatic variation is continuous along said longitudinal direction.

6. The system according to claim 1, wherein said adiabatic variation is discrete along said longitudinal direction.

7. The system according to claim 1, wherein said variation is from a positive mismatch to a frequency of said optical pulse to a negative mismatch to said frequency.

8. The system according to claim 1, wherein each period of said adiabatic variation has a length within an order of magnitude of a wavelength of said optical pulse.

9. The system according to claim 1, wherein said adiabatically varying crystal grating period is characterized by a nonlinear susceptibility which alternate in sign along said longitudinal direction.

10. The system according to claim 1, wherein said crystal is a poled crystal.

11. The system according to claim 1, wherein said crystal is an angle phase matched crystal.

12. The system according to claim 1, wherein said crystal is a birefringence phase-matched crystal.

13. The system according to claim 1, wherein said crystal is under a temperature gradient.

14. The system according to claim 1, wherein said crystal grating function is within less than 20% from a predetermined polynomial function of z, for any value of z within a length of said crystal, wherein said predetermined polynomial function is one of the functions listed in Tables 1-6.

15. A method of frequency conversion, comprising directing a plurality of input optical pulses, each having the same wavelength and energy of less than 100 μJ, to a harmonic generation crystal thereby effecting frequency multiplication of said optical pulses, wherein said harmonic generation crystal comprises a structure characterized by a nonlinear susceptibility, and a crystal grating period which adiabatically varies along said longitudinal direction in a manner that said crystal grating period is inversely proportional to a crystal grating function of a coordinate z measured along said longitudinal direction;

wherein said crystal grating function is selected to provide conversion efficiency that varies by at most ±20% over a bandwidth of said pulses.

16. A method of spectroscopy, comprising executing the method according to claim 15 to provide a harmonic of said optical pulse, probing a sample by said harmonic, and analyzing a signal received from said sample following said probing.

17. A method of manipulating a light beam, comprising shaping a light pulse and executing the method according to claim 15, using said shaped pulse as said input optical pulse.

18. A method of imaging, comprising executing the method according to claim 15 to provide a harmonic of said optical pulse, directing said harmonic to a target, and generating an image of said target based on a signal received from said target following said directing.

19. A system for frequency conversion, comprising a laser source and a harmonic generation crystal, wherein said laser source is configured to produce optical pulse energy of less than 100 µJ, and wherein said harmonic generation crystal comprises a structure characterized by a nonlinear susceptibility, and a crystal grating period which adiabatically varies along said longitudinal direction in a manner that said crystal grating period is inversely proportional to a crystal grating function of a coordinate z measured along said longitudinal direction;

wherein said crystal grating function is within less than 20% from a predetermined polynomial function of z, for any value of z within a length of said crystal, wherein said predetermined polynomial function is one of the functions listed in Tables 1-6.

* * * * *